Nov. 12, 1957 — C. A. MATTHEWS — 2,812,586
SINE BAR FOR COMPOUND ANGLES

Filed Aug. 20, 1956 — 3 Sheets-Sheet 1

INVENTOR.
C.A. MATTHEWS
BY George Stell
AGENT

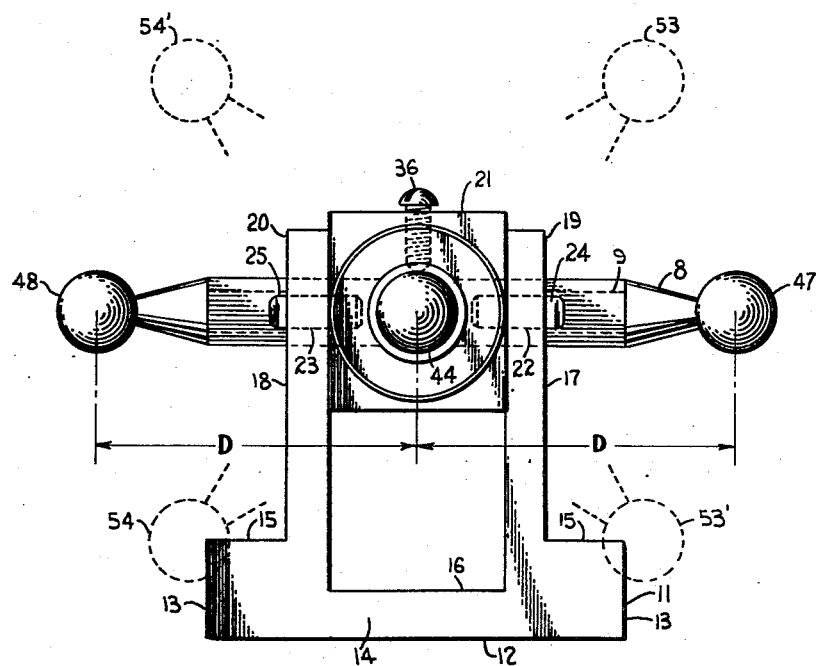
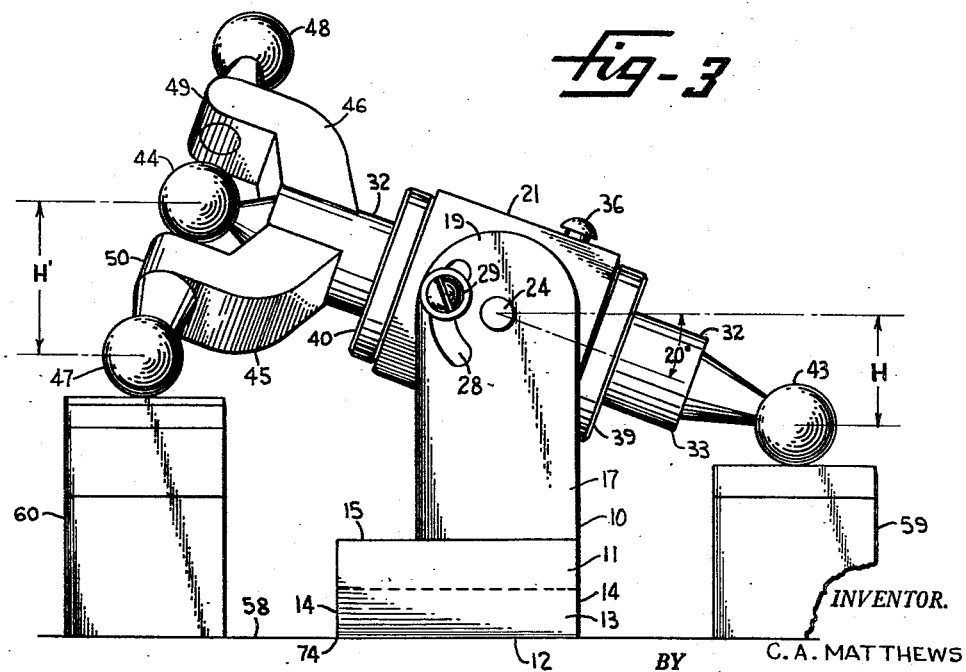

United States Patent Office 2,812,586
Patented Nov. 12, 1957

2,812,586

SINE BAR FOR COMPOUND ANGLES

Claude A. Matthews, Chino, Calif., assignor to Rohr Aircraft Corporation, Chula Vista, Calif., a corporation of California Application August 20, 1956, Serial No. 605,115

11 Claims. (Cl. 33—174)

This invention relates to a tool in the nature of a sine bar adapted for a variety of uses in a machine shop to accurately determine the angle at which a plane face on a workpiece is disposed or to set such face at a predetermined angle so that it may be ground or otherwise machined.

The principal object of the invention is the provision of a tool which is designed and adapted for accurately ascertaining the sines of compound as well as simple angles in order to measure or lay out work of various kinds in degrees and minutes.

Another object is to provide a tool capable of being readily adjusted to different angular positions and locked at any desired position to determine the inclination with reference to a horizontal or vertical plane of a flat face on a workpiece, jig, fixture or other article.

A further object is to provide a tool of the type indicated which is simple in construction, has no calibrations or graduated scale, is light in weight and may be handled expeditiously in finding or testing angles in various lines of work.

The nature of the invention and its distinguishing features and advantages will appear from the following specification when read in conjunction with the accompanying drawing, in which:

Fig. 3 is an end view of the tool taken from the left in Fig. 1.

Fig. 4 illustrates the manner in which the tool is set to indicate a desired compound angle and Fig. 5 illustrates the manner in which the tool is used to check the face of a workpiece disposed at a compound angle.

Figure 1:
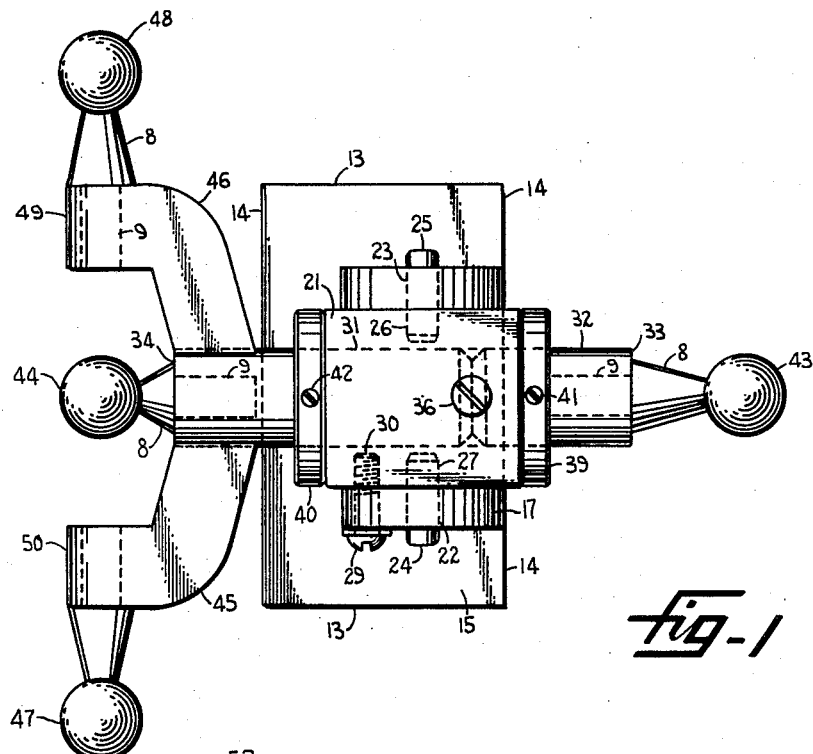
Fig. 1 is a top view of the tool.
Figure 2:
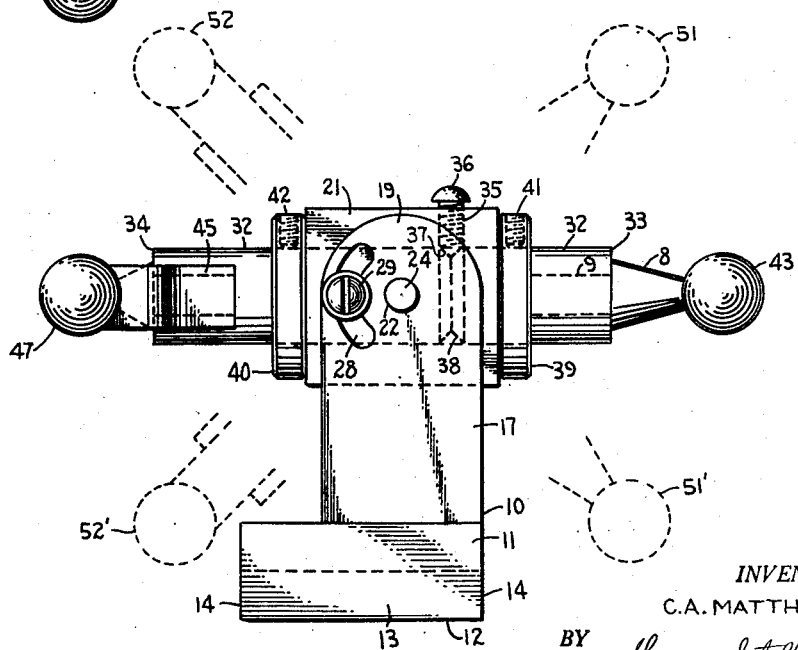
Fig. 2 is a side view of the tool.

With reference to Figs. 1 to 3 of the drawing the tool comprises a frame 10 having a base 11 provided with a plane lower surface 12. The sides 13 of base 11 are parallel to each other and normal to lower surface 12 and the ends 14 of base 11 are also parallel to each other and normal to surface 12 and sides 13. The upper surfaces 15 and 16 of base 11 are parallel to surface 12 and normal to sides and ends 13 and 14. Extending upwardly from base 11 are two spaced apart supporting members 17 and 18 between the upper ends 19 and 20 of which is disposed a rectangularly shaped block 21. Members 17 and 18 are provided with aligned openings 22 and 23 adjacent their ends 19 and 20 arranged to contain generally cylindrical pivot pins 24 and 25 extending therethrough into openings 26 and 27 in block 21 to pivotally support block 21 between ends 19 and 20. Pins 24 and 25 are positioned with their axes in alignment with each other and parallel to surface 12 of base 11 so that pivotal movement of block 21 on pins 24 and 25 is in a plane normal to surface 12. Supporting member 17 is provided with an arcuate slot 28 through which a threaded screw 29 passes into a threaded opening 30 in block 21 to provide a means for locking block 21 in any desired adjusted position for a purpose to be explained. Block 21 is provided with a cylindrical bore 31 the axis of which is normal to and intersects the axes of pins 24 and 25, in which a cylindrical rod 32 is positioned with the axis thereof coinciding with the axis of the bore. Rod 32 engages the wall of bore 31 in smooth sliding contact so that the rod may be easily rotated therein and the ends 33 and 34 of the rod project outwardly from the ends of block 21 for a substantial distance. To lock rod 32 in a desired rotated position in bore 31, block 21 is provided with a threaded opening 35 extending into the bore which contains a threaded screw 36 having a conical lower end 37 arranged to engage and press against the converging walls of a groove 38 in rod 32 upon rotation of the screw. Rod 32 is secured in bore 31 and endwise movement of the rod therein prevented, by a pair of collars 39 and 40 which surround rod 32 at each end of block 21 and are secured to the rod by set screws 41 and 42. Attached to extending ends 33 and 34 of rod 32 are spheres 43 and 44 which are identical in size and which are positioned so that their centers are in alignment with the axes of rod 32 and bore 31 and spaced exactly the same distance in opposite directions from the axes of pins 24 and 25. Attached to rod 32 adjacent end 34 thereof are outwardly extending arms 45 and 46 preferably shaped as shown in Fig. 1 and arranged for attachment of spheres 47 and 48 to the extending ends 49 and 50 thereof. Spheres 47 and 48 are identical in size to spheres 43 and 44 and are positioned on arms 45 and 46 so that the centers thereof and the center of sphere 44 are in alignment with each other along a line normal to the axes of bore 31 and rod 32. Spheres 47 and 48 are spaced away from sphere 44 so that the distances D from the center of sphere 44 to the center of each of spheres 47 and 48 are exactly equal and are also exactly equal to the distance between the axes of pins 24 and 25 and the centers of spheres 43 and 44. Spheres 43, 44, 47 and 48 are all provided with integral shanks 8 arranged so that a portion thereof extends into openings 9 in rod 32 and arms 45 and 46 whereby the spheres are attached to the rod and arms.

In the above described assembly block 21 is arranged for sufficient pivotal movement on pins 24 and 25 to permit sphere 43 to be raised or lowered to the positions shown in Fig. 2 by phantom lines 51 and 51', such movement also causing spheres 44, 47 and 48 to be oppositely lowered or raised exactly the same amount as shown by phantom lines 52 and 52'. Also rod 32 may be rotated in bore 32 sufficiently to raise or lower sphere 47 to the positions shown in Fig. 3 by phantom lines 53 and 53' which also causes sphere 48 to be oppositely lowered or raised exactly the same amount as shown by phantom lines 54 and 54'.

The tool is set to indicate the angles of a compound angle by first positioning spheres 43 and 44 so that their centers are on a line disposed at an angle to surface 12 of base 11 which corresponds to one of the angles of the compound angle. Rod 32 is then rotated about its axis to position spheres 47 and 48 so that their centers lie on a line disposed at an angle to surface 12 which corresponds to the other angle of the compound angle.

Figure 5:
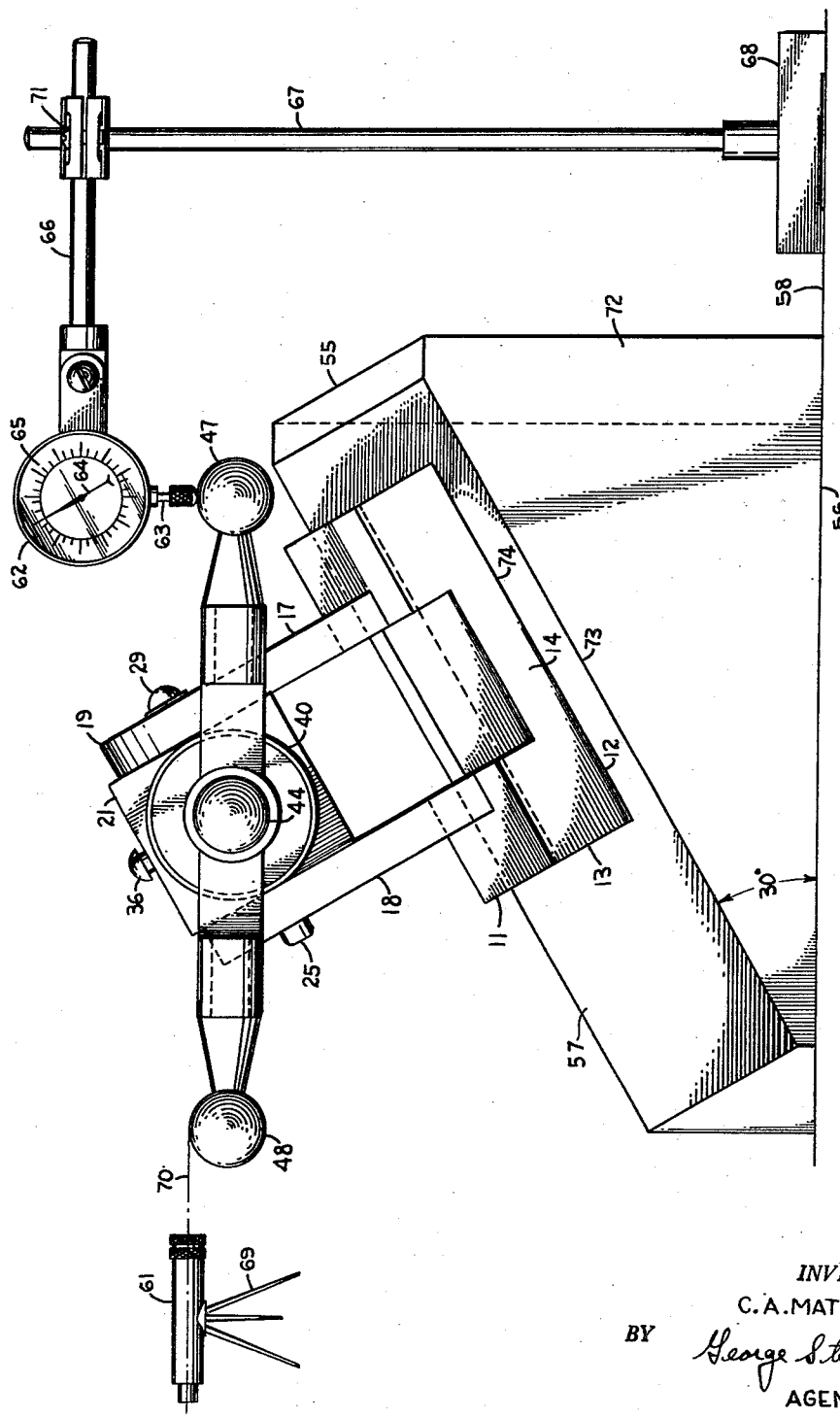

To illustrate a method of accurately setting the tool at a certain compound angle and the manner in which the tool may then be used to check the face of a workpiece inclined at the same compound angle, reference is made to Figs. 4 and 5 of the drawing. In Fig. 5 is shown a workpiece 55 having a plane lower face 56 and an upper face 57 cut at a compound angle of 20° to face 56 in one direction and 30° to face 56 in a direction normal to the first. The front face 72 of the workpiece is vertical and intersects face 57 along a straight line 73 inclined at an angle of 30° to face 56. To set the tool at the above compound angle for the purpose of checking the accuracy with which face 57 has been cut, the tool is first placed on a plane horizontal surface 58, such as a precision ground surface plate, with surface 12 of base 11 in contact with surface 58. The positions of spheres 43, 44, 47 and 48 are then adjusted by pivotal movement of block 21 on pins 24 and 25 and by rotation of rod 32 in bore 31 until all of the spheres are in a horizontal plane and therefore equidistant from surface 58. Assuming that the distance from surface 58 to the axes of pins 24 and 25 and to the center of each of the spheres is 4 inches, that the distance from the axis of pins 24 and 25 to the center of each of spheres 43 and 44 is 3 inches that the centers of spheres 47 and 48 are 3 inches from the axis of rod 32, and that all of the spheres are .500 of an inch in diameter, then spheres 43 and 44 may be moved to a position in which the centers thereof lie on a line inclined at an angle of 20° to surface 12 in the following manner.

With spheres 43 and 44 in a horizontal plane, a line extending from the axis of pins 24 and 25 to the center of sphere 43 is 3 inches long and parallel to surface 58. By pivoting block 21 on pins 24 and 25 so that sphere 43 is lowered a distance H so that a line extending from the axis of the pins to the center of sphere 43 is inclined at an angle of 20° to surface 58, it follows from trigonometry that $H=3$ inches times the sine of 20° or $H=3\times.342=1.026$ inches, the distance that sphere 43 is lowered. As before described, movement of sphere 43 causes sphere 44 to be moved exactly the same amount in the opposite direction so that when sphere 43 is lowered 1.026 inches spheres 44, 47 and 48 are raised a like amount thus positioning the centers of all the spheres in a plane inclined at an angle of 20° to surface 58.

The downward movement of sphere 43 may be accurately controlled to exactly the required distance by means of a combination of precision gage blocks 59. The height of gage blocks 59 is such that when they are placed on surface 58 under sphere 43 and the sphere is lowered it will contact the upper surface of the top block when the sphere has been lowered 1.026 inches. The height of blocks 59 is determined by subtracting one half of the diameter of sphere 43 (.250 inch) plus 1.026 inches from the distance between surface 58 and the axis of pins 24—25 (4.000 inches). The required height of blocks 59 is therefore 2.724 inches. After sphere 43 has been lowered into contact with the upper surface of the blocks, block 21 is then locked in adjusted position by tightening screw 29.

To position spheres 47 and 48 so that the centers thereof lie on a line disposed at an angle of 30° to surface 58, sphere 47 is lowered a distance H' by rotating rod 32 in bore 31. Since the distance from the center of sphere 44 which is in alignment with the axis of rod 30, to the center of sphere 47 in three inches, rotation of rod 32 moving sphere 47 downward describes a triangle having its apex at the center of sphere 44 and having two sides 3 inches long disposed at an angle of 30° to each other. The third side of the triangle which is distance H' may then be determined by the formula $$H'=3\times \text{sine } 30°=3\times.500=1.500 \text{ inches}$$

the distance that sphere 47 is to be lowered.

The downward movement of sphere 47 is controlled to exactly the required distance through the use of a combination of precision gage blocks 60 placed under sphere 47. The height of gage blocks 60 is determined by adding to 4 inches the distance that sphere 47 was raised (1.026 inches) when sphere 43 was lowered and subtracting the sum of 1.500+.250 inches resulting in a height of 3.276 inches. Gage blocks 60 of this height are placed on surface 58 and rod 32 is rotated in bore 31 to lower sphere 47 into contact with the supper surface of blocks 60. Rod 32 is then locked in position by tightening screw 36 to hold spheres 47 and 48 in adjusted positions to complete the operation of setting the tool at a compound angle corresponding to the compound angle of face 57 of workpiece 55.

To use the tool for checking the accuracy with which face 57 has been cut, workpiece 55 is placed on horizontal plane surface 58 and the tool is rotated 90° from the position shown in Fig. 4 and placed on face 57 with surface 12 of base 11 in contact with face 57 and inclined at the same compound angle. Base 11 is positioned on face 57 so that the long edge 74 (see Fig. 4) at which surface 12 intersects end 14 is parallel to line 73. As shown in Fig. 5, with the tool positioned on face 57 in this manner all of the spheres will lie in a horizontal plane parallel to surface 58 if face 57 has been cut at the proper angle. Base 11 is secured to face 57 in this position by means of clamps (not shown) or other suitable fastening means while the distance between each of the spheres and surface 58 is checked.

The distance between surface 58 and each of the spheres is then checked using an instrument with which any small variations between the distances may be easily noted such as an alignment telescope 61 or dial indicator 62 as shown in Fig. 5. Indicator 62 is a known type having a contact rod extending downwardly therefrom and constructed so that vertical movement of the rod is indicated by a corresponding movement of an indicating hand 64 along a graduated dial 65. The indicator is supported on a horizontal rod 66 adjustably attached to a vertical rod 67 which is provided with a base 68 in contact with and movable on surface 58. Indicator 62 is positioned over one of the spheres and rod 66 is adjusted along rod 67 so that the end of rod 63 is pressed lightly against the extreme upper surface of the sphere and rod 66 locked in position by tightening screw 71. The reading of hand 64 on dial 65 is noted and the indicator is then moved over each of the remaining spheres by sliding base 68 along surface 58. As rod 63 is brought into contact with the extreme upper surface of each of the remaining spheres, hand 64 will be at the same position on dial 65 in each instance if the centers of all of the spheres are in a horizontal plane parallel to surface 58. If the hand is not in the same position on the dial in each instance, it is evident that the centers of the spheres are not in a horizontal plane and that, therefore, the angles of face 57 have not been accurately cut.

Alignment telescope 61 is a known type provided with horizontal and vertical cross hairs (not shown) and pivotally mounted for rotation about a vertical axis on a support 69. The telescope is leveled on support 69 so that its axis is parallel to surface 58 and positioned so that the center of its line of sight, indicated at 70, is parallel to surface 58 and is tangent to the top point of one of the spheres. By pivoting telescope 61 on support 69 to bring each of the remaining spheres successively into the line of sight, the position of each sphere relative to the center of the line of sight may be seen and displacement of any of the spheres from a horizontal plane will be readily observed.

Many other methods of setting and using the tool will be apparent to those skilled in the art and it is, therefore, to be understood that the above described methods of setting and using the tool are illustrative only and not restrictive.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A tool comprising a frame having a plane exposed face of substantial area; a rod having a spherical end;

means on said frame for pivotally supporting said rod for rotation about a first axis parallel to said plane face and normal to and intersecting the axis of said rod; a rigid member having a spherical end; means connecting said member to said rod; and means carried by said frame for pivotally supporting said rigid member for rotation about an axis intersecting said first axis and normal thereto.

2. A tool as claimed in claim 1, in which adjustable locking means is constructed to lock said rod and rigid member at desired angles to said plane face.

3. A tool comprising a frame having a plane exposed face of substantial area; a rod; means on said frame for pivotally supporting said rod for movement about an axis parallel to said plane face and normal to and intersecting the axis of said rod; a first spherical member secured to one end of said rod; two spaced apart spherical members connected to the other end of said rod; and means carried by said frame for supporting said spaced apart spherical members for simultaneous angular movement in opposite directions in a plane parallel to said axis.

4. A tool as claimed in claim 3, in which the distance between the centers of said spaced apart spherical members is substantially twice the distance between the center of said first spherical member and said axis.

5. A tool as claimed in claim 3, in which adjustable locking means is constructed to lock said rod at a desired angle to said plane face.

6. A tool comprising a frame having a plane exposed face of substantial area; a rod; a pair of aligned spherical members connected to the opposite ends of said rod; a pivotal support on said frame midway between said spherical members for supporting said rod for rotation about an axis parallel to said plane face and normal to and intersecting the axis of said rod; a third spherical member connected to said rod; and means carried by said frame for supporting said third spherical member for rotation about a second axis intersecting said first axis and normal thereto.

7. A tool as claimed in claim 6, in which the distance between the center of said third spherical member and second axis is equal to one half the distance between the centers of said aligned spherical members.

8. A tool comprising a frame having a plane exposed face of substantial area; a rod; first and second aligned spherical members connected to the opposite ends of said rod; a pivotal support on said frame midway between said spherical members constructed to support said rod for rotation about an axis parallel to said plane face and normal to and intersecting the axis of said rod; third and fourth spherical members connected to one end of said rod; and means carried by said frame for supporting said third and fourth spherical members for angular movement in opposite directions in a plane parallel to said axis.

9. A tool as claimed in claim 8, in which the distance between said third and fourth spherical members is equal to that between said first and second spherical members.

10. A tool as claimed in claim 8, in which said frame is provided with adjustable locking means constructed to lock said rod in position at a desired angle to said exposed face.

11. A tool comprising a frame having a base provided with a horizontal lower face and a pair of spaced apart arms projecting up from said base; a block disposed between said arms and having a horizontal bore therethrough; a pair of aligned pivot pins pivotally connecting said block to said arms, the axis of said pins being normal to the axis of said bore; a long rod extending through said bore and having a central cylindrical portion in contact with the marginal wall thereof; adjustable locking means constructed to lock said block to said frame; adjustable locking means constructed to lock said rod to said block; a first spherical member connected to one end of said rod with the center of said spherical member disposed on the axis of said bore; and a second spherical member connected to the other end of said rod, the distance between the axis of said second spherical member and the axis of said bore being substantially equal to the distance between the center of said first spherical member and the axis of said pins.

References Cited in the file of this patent

UNITED STATES PATENTS

| | | |
|---|---|---|
| 1,179,551 | Muller | Apr. 18, 1916 |
| 1,217,487 | Muller | Feb. 27, 1917 |

FOREIGN PATENTS

| | | |
|---|---|---|
| 563,219 | Great Britain | Aug. 3, 1944 |